July 20, 1937.  P. F. ROSSMANN  2,087,552
MOTOR VEHICLE
Filed Oct. 1, 1934
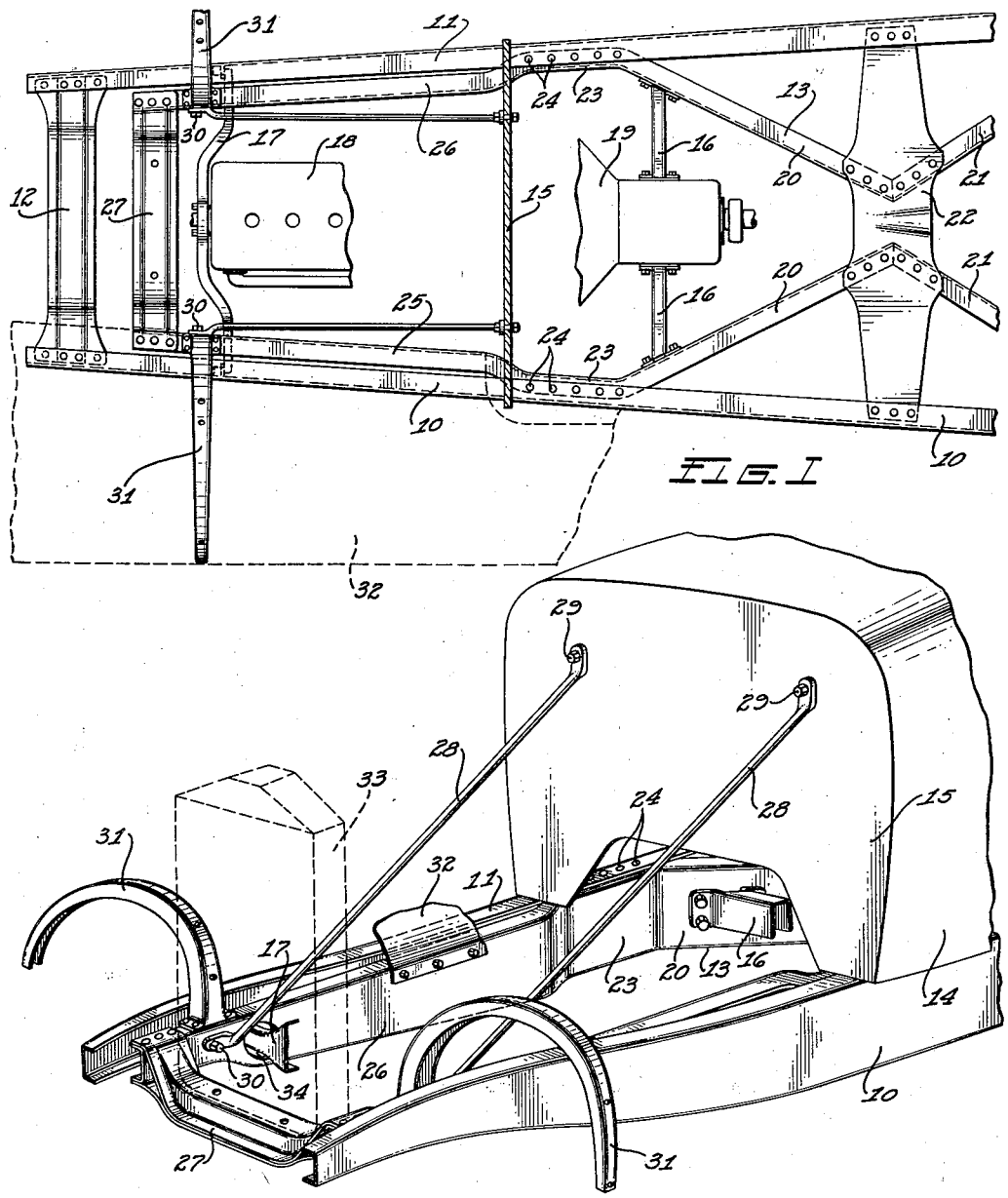
Inventor
PETER F. ROSSMANN.
By Milton Tibbetts
Attorney Patented July 20, 1937

2,087,552

UNITED STATES PATENT OFFICE 2,087,552

MOTOR VEHICLE

Peter F. Rossmann, Detroit, Mich., assignor to Packard Motor Car Company, Detroit, Mich., a corporation of Michigan Application October 1, 1934, Serial No. 746,298

11 Claims. (Cl. 280—106)

This invention relates to motor vehicles and more particularly to vehicle front end construction.

An object of my invention is to provide a front end structure for motor vehicles on which the radiator and the fenders can be carried so that they will not be subjected to torsional movement of the forward end of the main frame.

Another object of the invention is to provide a vehicle frame structure in which a portion of the main frame brace means is utilized for supporting the radiator and fenders in a relation such that they will not be subjected to torsional movement of the main frame.

A further object of the invention is to provide a suspended radiator and fender support which is not affected by torsional movement of the vehicle main frame.

Other objects of the invention will appear from the following description taken in connection with the drawing, which forms a part of this specification, and in which:

Fig. 1 is a plan view of the forward end of a vehicle chassis incorporating my invention;

Fig. 2 is a perspective view of the same which also includes the radiator and the forward end of the body.

Referring now to the drawing by characters of reference, 10 and 11 indicate a pair of vehicle frame side rails connected at their forward end by cross member 12 and centrally by an X-shaped brace member indicated generally at 13. The side rails, the front cross member and the X-shaped brace member form a portion of a motor vehicle main frame on which a body 14 having a dash 15 is fixed in the usual manner.

Carried by the X-brace member is a support 16 extending transversely of the frame and secured to the side rails forwardly of the support 16 is another support 17. The forward end of a motor 18 is carried by the support 17 and a transmission unit 19 is mounted on the support 16. The motor and the transmission unit are formed as an integral structure which is the usual practice in the construction of motor vehicles.

The X-shaped brace means comprises longitudinally extending sections each formed of a pair of angularly disposed rails 20 and 21 having the adjacent end portions forming apexes which are fixed to a transversely extending frame brace member 22. The forward arms 23 of the X-shaped brace means extend in parallel relation with the side rails and are secured thereto by rivets 24 or some similar fastening means. These parallel portions of the arms and the side rails are related so that they form a box-shaped structure in cross section.

When the fenders and the radiator are carried directly by the side rails 10 and 11 and the cross member 12, they are subjected to the torsional, weaving and vertical movements of the main frame and it is the purpose of this invention to provide a support for the radiator and fenders so that they will be substantially unaffected by such main frame movements. To this end I propose to provide an auxiliary frame support which is formed mainly by extending the arms of the X-brace member forwardly in a free relation as indicated at 25 and 26. These extensions are bent inwardly from the forward ends of the arms far enough to clear the side rails and they project preferably in parallel relation with the side rails beyond the inturned portions. The forward ends of these extensions are connected by a cross member 27. Except for the attachment to the side sills at the rear end of the extensions 25 and 26, this auxiliary frame is free from the main frame so that deflection of the forward end of the main frame will therefore not be transmitted to the auxiliary frame. Due to the fact that the dash and the body overlie the X-brace member and are fixed to the main frame, there will be substantially no deflection of the main frame extending directly thereunder. The major portion therefore of main frame deflection will occur forwardly of the body and the auxiliary supporting frame is substantially entirely free from this portion of the main frame.

Brace members 28 can be employed, if desired, to assist in supporting the forward end of the auxiliary frame. Such brace members are in the form of rods which are attached at their rear ends to the dash by bolts 29 and at their forward ends to the extensions 25 and 26 by bolts 30.

Fender brackets 31 are fixed to the top flanges of the rail extensions 25 and 26 by suitable fastening means, such brackets being located preferably a short distance at the rear of the cross brace member 27. Fenders, as indicated at 32, are supported on the brackets and are fixed along their inner edges to the auxiliary frame.

A radiator structure, as indicated at 33, is carried on the transversely extending brace member 27 of the auxiliary frame and is fixed thereto in any conventional manner.

The extensions 25 and 26 are formed with openings, as indicated at 34, through which the motor supporting member 17 extends. These openings are of considerably larger diameter than the width of the motor supporting member so that the member can move with the main frame side rails during their deflection without striking the extensions 25 and 26.

It will be seen that the radiator and fenders are mounted so that they will not be subjected to torsional, weaving and vertical movements of the forward end of the main frame and, consequently, they will be substantially stationary relative to the body.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a vehicle, a main frame having a pair of side rails and brace means connecting said side rails, a body fixed on the rear end of the main frame, auxiliary frame members extending along said side rails in advance of the body, means fixing the rear ends of said auxiliary frame members to said side rails adjacent the front end of the body, said auxiliary frame members being free from said side rails forwardly of their fixed portions, and brace means connecting the free end of said auxiliary frame members with said body.

2. In a vehicle, a main frame having a pair of side rails and brace means connecting said side rails, a body fixed on the rear end of the main frame, auxiliary frame members extending adjacent said side rails in advance of said body and toward the front end thereof, means fixing the rear ends of said auxiliary frame members to said side rails adjacent the forward end of said body, said auxiliary frame members being free from said side rails forwardly of their fixed portions, a cross member connecting the forward ends of said auxiliary side rails, and means rigidly connecting the free end of said auxiliary frame with the forward end of said body.

3. A motor vehicle frame comprising a pair of side rails, a motor supporting member extending transversely of and secured to said side rails, brace means connecting said side rails, auxiliary frame members extending inside of and adjacent said side rails, said auxiliary frame members having openings through which the motor supporting member extends, means fixing the rear ends of said auxiliary frame members to said rails, and transversely extending brace members connecting the free ends of said rails.

4. In a motor vehicle, a main frame having an X-shaped brace member connecting side rails, a dash fixed on the frame, extensions projecting forwardly of said X-shaped brace means in a free relation from said main frame, and brace means connecting the forward free end of said extensions with the dash.

5. A motor vehicle frame comprising a pair of side rails, brace means connecting said side rails, auxiliary frame members extending inside of and adjacent said side rails, means fixing the rear ends of said auxiliary frame members to said side rails, said auxiliary frame members being free of said side rails forwardly of their fixed portions, and fender support brackets fixed to said auxiliary frame members forwardly of their attached portions.

6. A motor vehicle frame comprising a pair of side rails, an X-shaped brace means connecting the rails and having forwardly extending arms fixed to the rails, extensions projecting inwardly of the arms and then forwardly in parallel relation with the rails in free relation relatively thereto, and a cross member connecting the forward ends of said extensions, said extensions and cross member forming an auxiliary support for the vehicle radiator and fenders.

7. A motor vehicle comprising a chassis frame, a body fixed on one end of said frame, a radiator, a pair of front fenders, an auxiliary frame fastened to the chassis frame beneath the body, said auxiliary frame rigidly supporting said radiator and said fender, the forward end of said auxiliary frame being free from said chassis frame to allow vertical and transverse movement of the chassis frame relative thereto, and brace means connecting the free portion of the auxiliary frame with the body.

8. A motor vehicle comprising a chassis frame, a body supported on the rear portion of said frame, a cowl at the forward end of said body, an auxiliary frame comprising side members and a cross member, a radiator and fenders fixed on said auxiliary frame, means fixing said auxiliary frame to said chassis frame adjacent said cowl, the portion of said auxiliary frame forward of said fixing means being entirely free from the adjacent portion of the chassis frame and means connecting the auxiliary frame with said cowl.

9. A motor vehicle comprising a chassis frame, a body supported on the rear portion of said frame, a dash at the forward end of said body, an auxiliary frame comprising side members and a cross member, a radiator and fenders fixed on said auxiliary frame, means fixing said auxiliary frame side members to said chassis frame below and at the rear of said dash, and brace rods connecting said auxiliary frame with the upper portion of said dash, said rods and fixing means being the only connection between the auxiliary frame and the chassis frame.

10. A motor vehicle comprising a chassis frame, a body supported on the rear portion of said frame, a cowl at the forward end of said body, an auxiliary frame extending forward from the cowl and having the rear end fixed to the main frame at the rear of the cowl, the forward end of said auxiliary frame being free from the main frame, and means holding the free end of the auxiliary frame substantially stationary with the cowl.

11. A motor vehicle comprising a chassis frame, a body supported on the rear portion of said frame, a cowl at the forward end of said body, an auxiliary frame extending forward from the cowl and having the rear end fixed to the main frame at the rear of the cowl, the forward end of said auxiliary frame being free from the main frame, fenders fixed on said auxiliary frame, and means holding the free end of the auxiliary frame substantially stationary with the cowl.

PETER F. ROSSMANN.